US012590483B2

(12) United States Patent
Duer et al.

(10) Patent No.: US 12,590,483 B2
(45) Date of Patent: Mar. 31, 2026

(54) GUIDE DEVICE FOR GUIDING A FURNITURE PART

(71) Applicant: Julius Blum GmbH, Hoechst (AT)

(72) Inventors: Stefan Duer, Schwarzach (AT); André Hammerer, Alberschwende (AT)

(73) Assignee: JULIUS BLUM GMBH, Hoechst (AT)

( * ) Notice: Subject to any disclaimer, the term of this patent is extended or adjusted under 35 U.S.C. 154(b) by 559 days.

(21) Appl. No.: 17/838,405

(22) Filed: Jun. 13, 2022

(65) Prior Publication Data

US 2022/0307305 A1 Sep. 29, 2022

Related U.S. Application Data

(63) Continuation of application No. PCT/AT2020/060451, filed on Dec. 11, 2020.

(30) Foreign Application Priority Data

Dec. 19, 2019 (AT) .............................. A 51124/2019

(51) Int. Cl.
*E05D 15/26* (2006.01)
*E05D 15/06* (2006.01)
*E05D 15/58* (2006.01)

(52) U.S. Cl.
CPC ......... *E05D 15/264* (2013.01); *E05D 15/063* (2013.01); *E05D 15/58* (2013.01); (Continued)

(58) Field of Classification Search
CPC ..... E05D 15/264; E05D 15/063; E05D 15/58; E05D 2015/586; E05Y 2201/692; E05Y 2600/626
See application file for complete search history.

(56) References Cited

U.S. PATENT DOCUMENTS 5,085,262 A * 2/1992 Tutikawa ............ E05D 15/0639 160/199
9,284,761 B2 3/2016 Haab et al.
(Continued)

FOREIGN PATENT DOCUMENTS

AT 516282 B1 * 4/2016 ................ E05F 1/10
AT 521140 11/2019
(Continued)

OTHER PUBLICATIONS

International Search Report issued Mar. 4, 2021 in International (PCT) Application No. PCT/AT2020/060451.

*Primary Examiner* — Jason W San
*Assistant Examiner* — Matthew J Sullivan
(74) *Attorney, Agent, or Firm* — Wenderoth, Lind & Ponack, L.L.P.

(57) ABSTRACT

A guide device, for guiding a furniture part on a guide rail, includes a rolling carriage having a rotatably mounted rolling body, via which the rolling carriage can be moveably mounted on a track of the guide rail, and a connection device, in particular designed as a hinge, for connecting the guide device to the furniture part. The rolling carriage and the connection device are designed as separate components and can be connected to one another, in particular detachably, via a securing device. The securing device has a locking element mounted on the connection device or on the rolling carriage such that it can rotate and move, preferably transverse to a securing direction of the connection device and the rolling carriage.

25 Claims, 10 Drawing Sheets

(52) U.S. Cl.
CPC ... *E05D 2015/586* (2013.01); *E05Y 2201/692* (2013.01); *E05Y 2600/626* (2013.01)

(56) References Cited

U.S. PATENT DOCUMENTS

| | | | | |
|---|---|---|---|---|
| 9,303,443 | B2 * | 4/2016 | Lucas | E06B 3/481 |
| 9,624,705 | B2 | 4/2017 | Haab et al. | |
| 10,316,565 | B2 | 6/2019 | Gabl | |
| 11,098,512 | B2 * | 8/2021 | Blum | A47B 61/00 |
| 11,118,386 | B2 * | 9/2021 | Rupp | E05D 15/26 |
| 11,725,441 | B2 * | 8/2023 | Duer | E05D 15/264 312/334.26 |
| 11,725,444 | B2 * | 8/2023 | Bohle | E05F 1/1058 16/64 |
| 2006/0277829 | A1 | 12/2006 | Kiefer | |
| 2014/0150208 | A1 | 6/2014 | Haab et al. | |
| 2016/0201368 | A1 | 7/2016 | Haab et al. | |
| 2017/0247924 | A1 | 8/2017 | Gabl | |
| 2020/0018106 | A1 | 1/2020 | Rupp et al. | |
| 2020/0048946 | A1 | 2/2020 | Blum et al. | |
| 2021/0262266 | A1 | 8/2021 | Duer et al. | |

FOREIGN PATENT DOCUMENTS

| | | | | | |
|---|---|---|---|---|---|
| AT | 521140 | B1 | * | 11/2019 | E05D 15/26 |
| CN | 107002438 | | | 8/2017 | |
| CN | 109209090 | A | * | 1/2019 | E05D 13/00 |
| CN | 109267872 | A | * | 1/2019 | A47B 95/00 |
| CN | 109577817 | A | * | 4/2019 | E06B 5/006 |
| DE | 3526288 | A | * | 1/1987 | |
| DE | 4407818 | A1 | * | 9/1995 | E05D 15/26 |
| DE | 103 19 170 | | | 11/2004 | |
| EP | 3880921 | B1 | * | 8/2023 | E05D 15/063 |
| EP | 4245954 | A2 | * | 9/2023 | E05D 15/0634 |
| EP | 4424960 | A1 | * | 9/2024 | E05D 5/0238 |
| JP | 2006-524760 | | | 11/2006 | |
| JP | 2014-114690 | | | 6/2014 | |
| JP | 2016-65394 | | | 4/2016 | |
| JP | 2020-518743 | | | 6/2020 | |
| KR | 200180525 | Y1 | * | 5/2000 | E05D 15/26 |
| KR | 20-2012-0006693 | | | 10/2012 | |
| TW | 201901017 | | | 1/2019 | |
| WO | 2018/204952 | | | 11/2018 | |
| WO | 2018/204955 | | | 11/2018 | |
| WO | WO-2018204955 | A1 | * | 11/2018 | E05D 15/063 |
| WO | WO-2020097647 | A1 | * | 5/2020 | E05D 15/26 |
| WO | WO-2020160581 | A1 | * | 8/2020 | E05D 15/58 |
| WO | WO-2021119689 | A1 | * | 6/2021 | E05D 15/063 |
| WO | WO-2024231138 | A1 | * | 11/2024 | E05D 15/26 |

* cited by examiner

GUIDE DEVICE FOR GUIDING A FURNITURE PART

BACKGROUND OF THE INVENTION

The invention relates to a guide device, a guide assembly comprising at least one guide rail and at least one such guide device, a piece of furniture with at least one furniture part, in particular a sliding door or folding sliding door, a furniture carcass and at least one such guide assembly, and finally a method for installing at least one furniture part, in particular a sliding door or folding sliding door, on at least one such guide assembly.

Guide devices are known from AT 521 140. In order to connect it to the chassis the connection device must be lifted against the weight force of the furniture part and pivoted about an axis of rotation. This is inconvenient for an installer in particular in the case of very heavy furniture parts.

SUMMARY OF THE INVENTION

The object of the present invention is to specify a guide device that is improved compared with the state of the art, in which the disadvantages of the state of the art are avoided and which is characterized in particular by an easier installation. A further object is to specify a guide assembly with a guide device improved in such a way, a piece of furniture with a guide assembly which comprises a guide device improved in such a way, as well as a method for installing at least one furniture part on at least one such guide assembly.

In the case of the guide device according to the invention, it is therefore provided that the at least one fastening device comprises at least one locking element which is mounted rotatably and displaceably, preferably transverse to a fastening direction of the at least one connection device and the at least one chassis, on the at least one connection device or on the at least one chassis. Through the rotatable and at the same time displaceable mounting of the locking element, a lifting and pivoting of the furniture part during the connection of the connection device and the chassis can be avoided. Instead the connection can be effected by a pure translational movement of the connection device or of the furniture part that is or can be connected thereto.

BRIEF DESCRIPTION OF THE DRAWINGS

Further details and advantages of the invention are explained in more detail with reference to the drawings, in which:

FIG. 3*a* shows a perspective view and partial FIG. 3*b* shows a side view, FIG. 4*a* shows a perspective view and partial FIG. 4*b* shows an exploded view, FIG. 5*a* shows a perspective view and partial FIG. 5*b* shows an exploded view, FIG. 7*a* shows a perspective view and partial FIG. 7*b* shows a cross-sectional view from above along the section plane 64, FIG. 8*a* shows a perspective view and partial FIG. 8*b* shows a cross-sectional view from above along the section plane 64 (cf. FIG. 7*a*).

DETAILED DESCRIPTION OF THE INVENTION

Figure 1A:
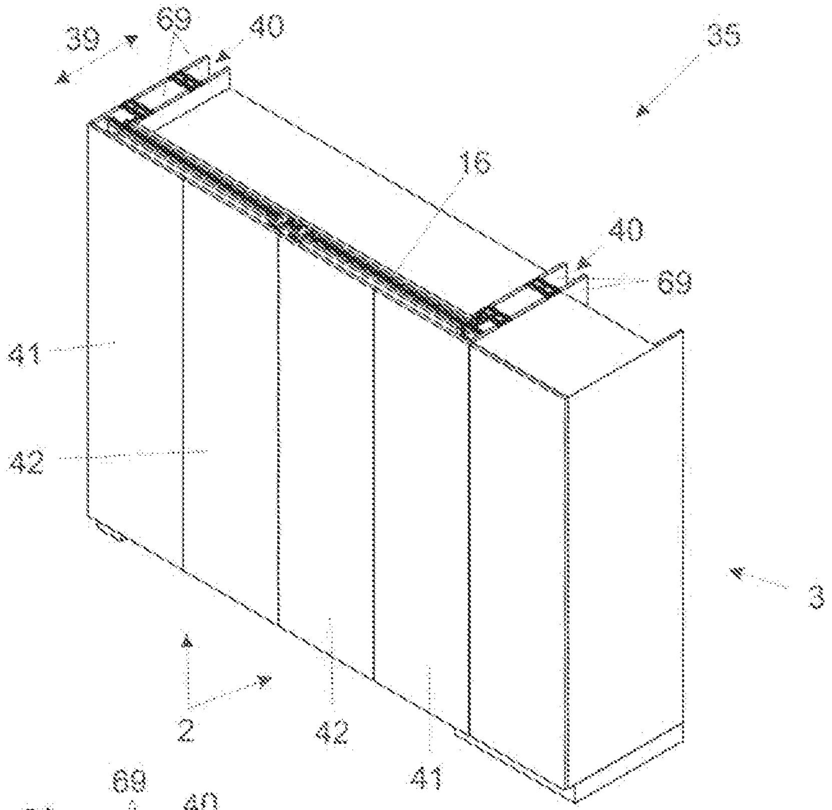
FIGS. 1*a*-1*d* are perspective views in each case of a piece of furniture with two folding sliding doors, wherein the doors are arranged in a coplanar closed position in partial FIG. 1*a*, one of the doors is arranged in a folded-out position in partial FIG. 1*b*, the doors are arranged in a parallel position outside the furniture carcass in partial FIG. 1*c* and in a parallel position in cavities of the furniture carcass in partial FIG. 1*d*.

FIGS. 1*a* to 1*d* show by way of example a piece of furniture 35 with two furniture parts 2 in the form of folding sliding doors, in which the present invention can be used. Instead of folding sliding doors, other furniture parts 2, such as e.g. folding or sliding doors or flaps that can be opened in the vertical direction, can also be used.

The piece of furniture 35 comprises a furniture carcass 3 and a guide assembly 34 which is described in detail in connection with FIG. 2.

In the case represented, the piece of furniture 35 has an interior 36 which can be covered by the furniture parts 2 at least in regions and in which kitchen furniture 37, 38, for example in the form of floor units 38 or wall units 37, and kitchen appliances, such as e.g. a cooker or a dishwasher, can be arranged.

The piece of furniture 35 has two cavities 40 extending in a depth direction 39 of the piece of furniture 35 for at least partially receiving in each case one furniture part 2. In FIG. 1*d* the furniture parts 2 protrude a short way out of the cavities 40. The piece of furniture 35 can, however, also be such that the furniture parts 40 can be sunk completely into the cavities 40.

Figure 1B:
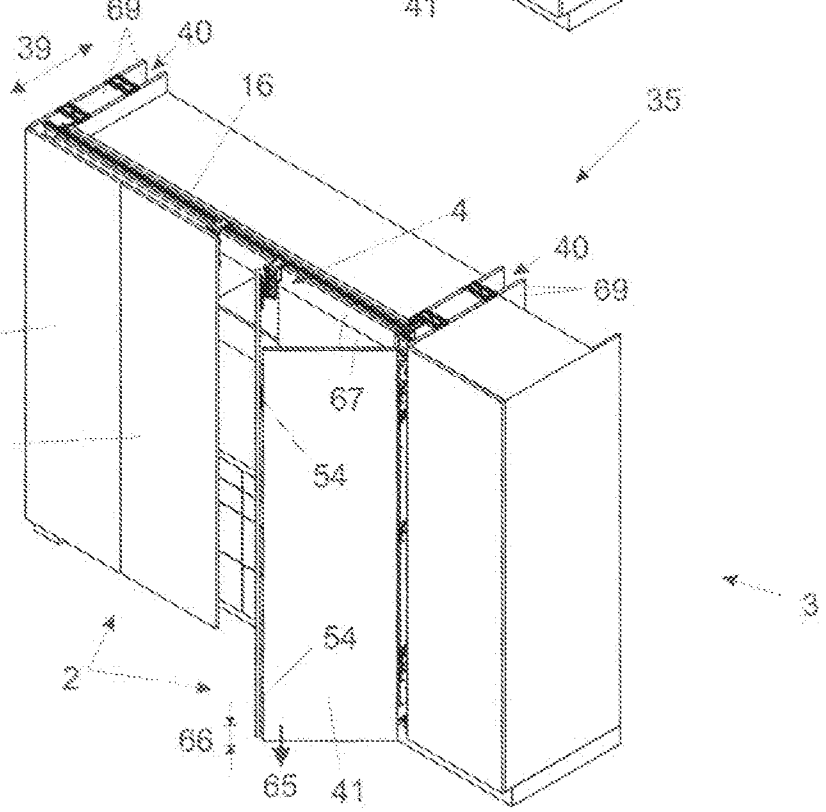
Figure 1C:
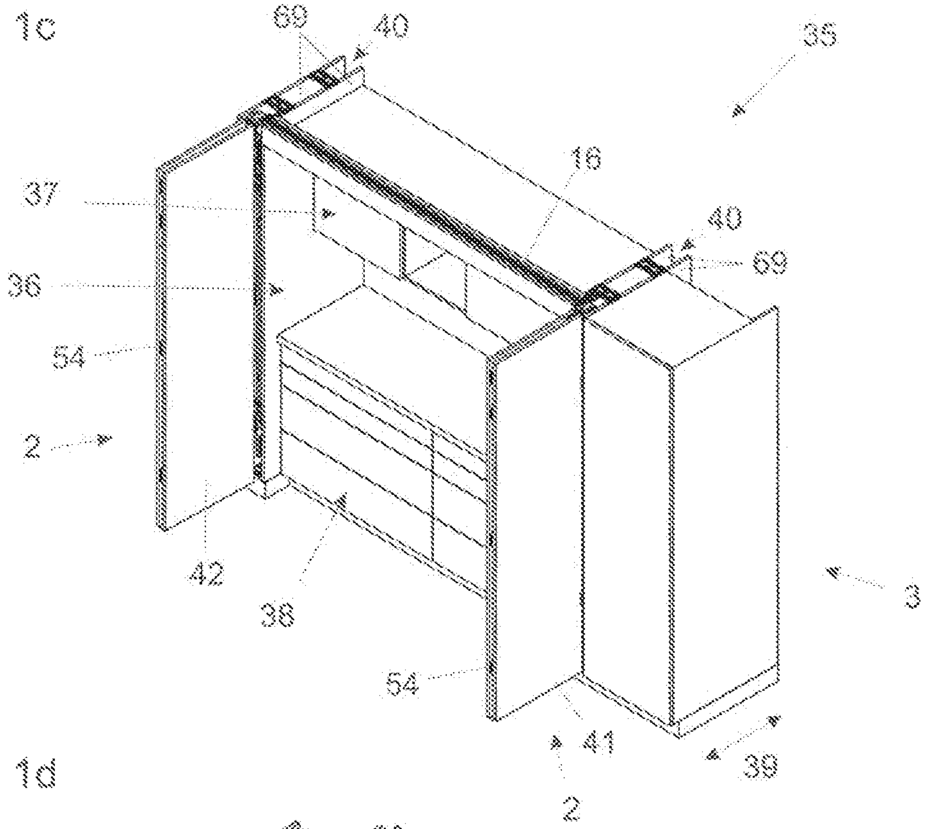
Figure 1D:
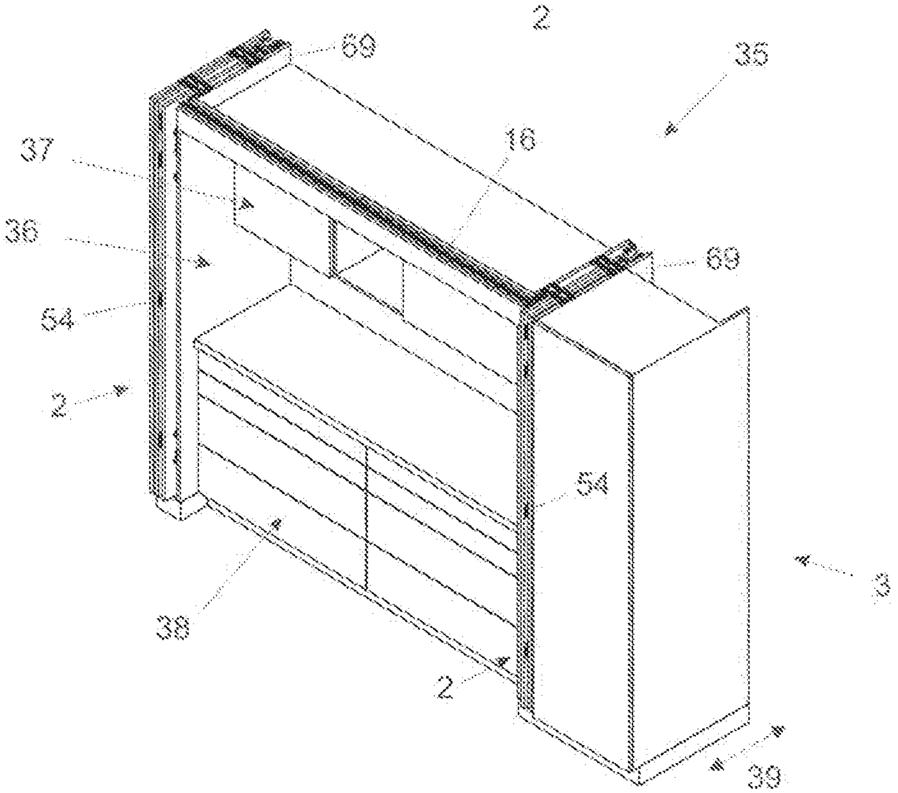

FIGS. 1*a* to 1*d* show different positions of the furniture parts 2 relative to the furniture carcass 3: the folding sliding doors are arranged in a coplanar closed position in partial FIG. 1*a*; one of the doors is arranged in a folded-out position in partial FIG. 1*b*; the doors are arranged in a parallel position outside the furniture carcass 3 in partial FIG. 1*c* and in a parallel position in cavities 40 of the furniture carcass 3 in partial FIG. 1*d*.

As in the case represented, the furniture parts 2 can have in each case two panel elements 41, 42 connected to each other in an articulated manner, e.g. via hinges 54.

The piece of furniture 35 can have a vertical carrier, on which one of the panel elements 41, 42 is arranged. The vertical carrier can be guided movably on side walls 69 via guides in the depth direction 39.

As in the case represented, the furniture parts 2 can in each case be connected to a guide device 4 or a guide assembly 34 via a connection device 1.

Figure 2:
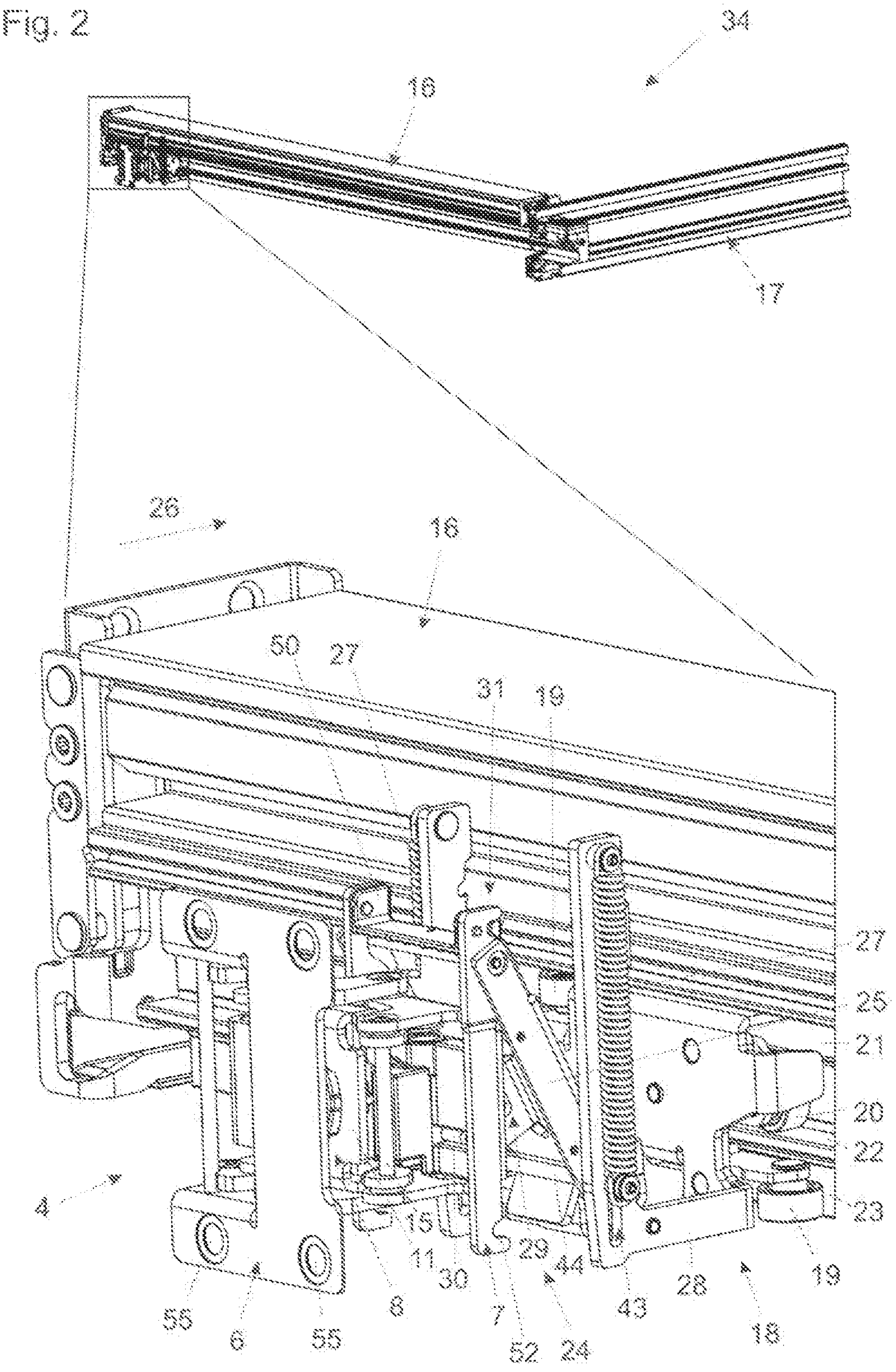
FIG. 2 shows an embodiment of a guide assembly in a perspective view, wherein a portion of the guide assembly is represented enlarged.

FIG. 2 shows an embodiment example of a guide assembly 34.

The guide assembly 34 comprises guide rails 16, 17 and at least one guide device 4 for guiding a furniture part 2 on the guide rails 16, 17. In the case represented, the guide assembly 34 comprises two guide rails 16, 17 which are arranged substantially transverse to each other.

The guide device 4 comprises a chassis 18 with rotatably mounted rolling bodies 19, 20 via which the chassis 18 can be mounted displaceably on tracks 21, 22, 23 of the guide rail 16. The rolling bodies 19 are mounted rotatably about a substantially vertical axis and function as lateral supporting rollers. The rolling bodies 20 are mounted rotatably about a substantially horizontal axis and function as carrying rollers.

The guide device 4 further comprises a connection device 1, formed as a hinge in the case shown, for connecting the guide device 4 to the furniture part 2.

The chassis 18 and the connection device 1 are formed as separate assemblies and can be detachably connected to each other via a fastening device 24.

The fastening device 24 comprises a locking element 25 which is mounted rotatably (i.e., rotational movement) and displaceably (i.e., translational movement), in the case represented transverse to a fastening direction 26 of the connection device 1 and the chassis 18, on the chassis 18. Equally, the locking element 25 can also be mounted rotatably and displaceably on the connection device 1. More than one locking element 25 can also be provided, which are mounted rotatably and displaceably on the connection device 1 and/or on the chassis 18.

Figure 3A:
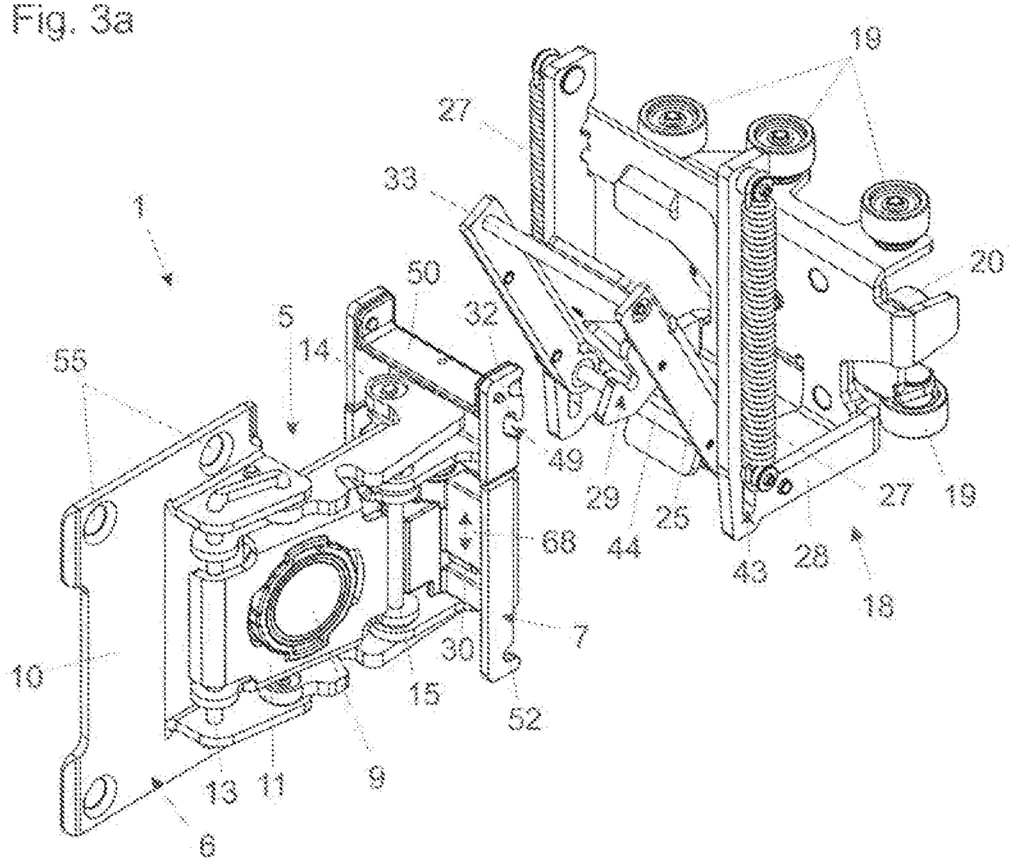
FIGS. 3*a*, 3*b* show an embodiment of a guide device in an unconnected state, wherein partial
Figure 3B:
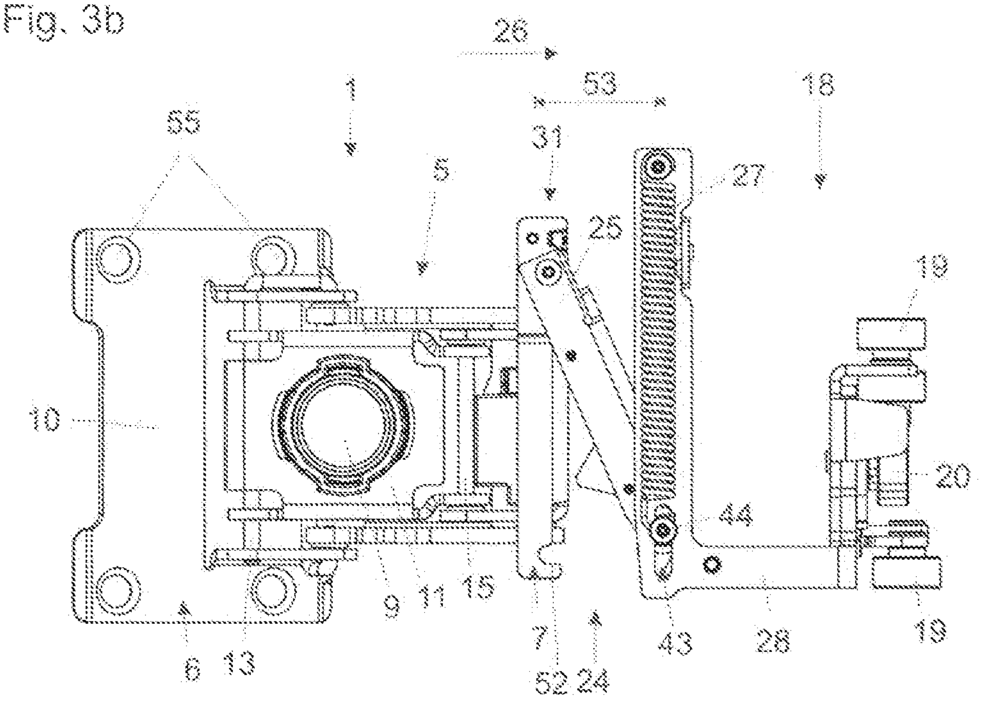

FIGS. 3*a* and 3*b* show the guide device 4 in an unconnected state.

The chassis 18 has a base 28, wherein the locking element 25 is mounted rotatably and displaceably on the base 28. In the case represented, it the locking element 25 is released mechanically through a pivot pin 44 mounted displaceably in an elongated hole 43 so that the pivot pin 44 (and locking element 25) can be displaced in a translational manner along the elongated hole 43, while also allowing the locking element 25 to rotate about the pivot pin 44.

The locking element 25 is formed as a pivot plate.

The locking element 25 is connected to the base 28 via springs 27, specifically tension springs, wherein the springs 27 are connected to the locking element 25 and the base 28 in such a way that the springs 27 can be tensioned during a connection of the connection device 1 and the chassis 18 (cf. also FIGS. 6*a* to 6*d*). In the case represented, the springs 27 are fastened on the base 28 via spring mountings 63 (cf. also FIG. 5*b*).

The technical background of the springs 27 is as follows: if the folding sliding doors are arranged in the coplanar and the parallel position, the folding sliding doors are in a relatively stable state due to the rigidity of the fittings via which the folding sliding doors are connected to the piece of furniture 35. The behavior is different if the folding sliding doors are arranged in an intermediate position between these two maximum positions: in this case a drop 66 of the folding sliding doors which is greatest in the region of the articulated connection of the door leaves can occur under the influence of the weight force 65 (cf. FIG. 1*b*).

This drop can have negative effects: the drop 66 that is dependent on the angle 67 can lead to wear and tear on the fittings via which the folding sliding doors are connected to the piece of furniture 35. Furthermore, the drop 66 can even result in the folding sliding doors grazing the ground in an intermediate position, which can cause a jamming of the folding sliding doors and/or wear of the folding sliding doors in the lower region.

One way of counteracting this drop 66 is to reproduce the fittings as stably as possible. However, this is only possible to a limited extent. This approach would also result in a very large amount of material required in particular during the formation of the guide rail or guide rails being used, which is in turn associated with high costs.

In the present case another approach is followed, which consists of the chassis 18 comprising an energy storage mechanism in the form of two springs 27, through which a force opposing the weight force 65 can be applied to the furniture part 2 when in use. Through this measure it is possible to counteract the drop 66 of the furniture part 2 in an intermediate position between the coplanar position and the parallel position in a targeted manner. The drop 66 can thereby be limited to a tolerable amount, in the case of which the disadvantages described can be avoided as far as possible. It is suitable for the energy storage mechanism to be formed to provide a predetermined maximum force, preferably between 50 N and 150 N.

The fastening device 25, via which the connection device 1 and the chassis 18 can be connected to each other, comprises a locking contour 29 and a locking pin 30 that can be locked in or on the locking contour 29. In the case represented, the locking contour 29 is arranged on the chassis 18 and the locking pin 30 is arranged on the connection device 1. Equally, the locking contour 29 can also be arranged on the connection device 1 and the locking pin 30 can be arranged on the chassis 18.

Figure 4A:
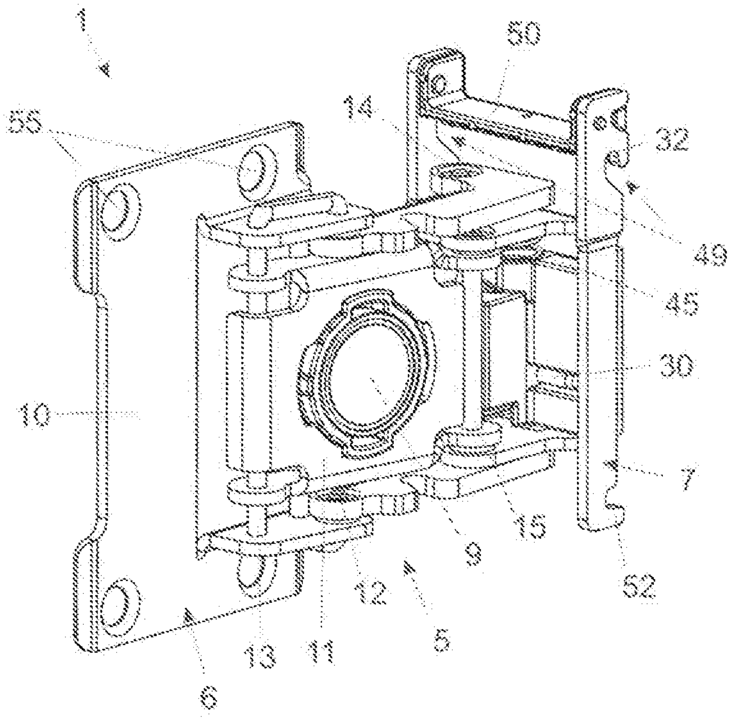
FIGS. 4*a*, 4*b* show an embodiment of a connection device, wherein partial
Figure 4B:
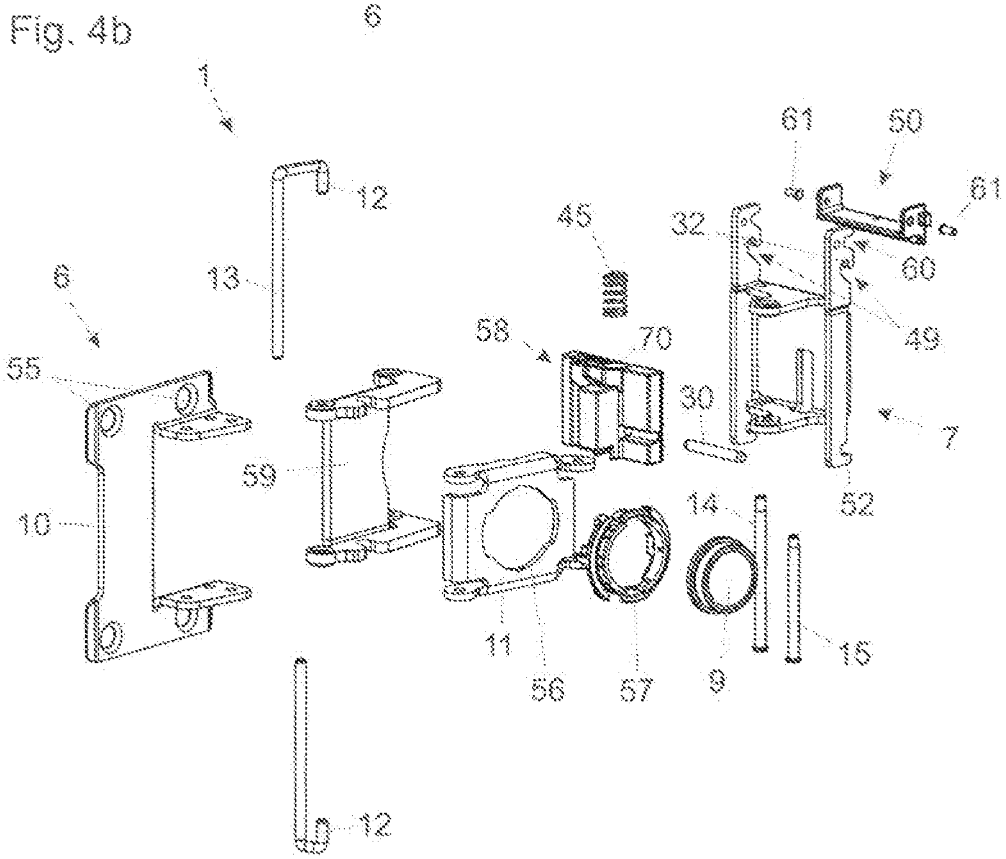

A spring force is applied to the locking pin 30 by a spring element 45, e.g. formed as a compression spring (cf. e.g. FIG. 4*b*).

Figure 6A:
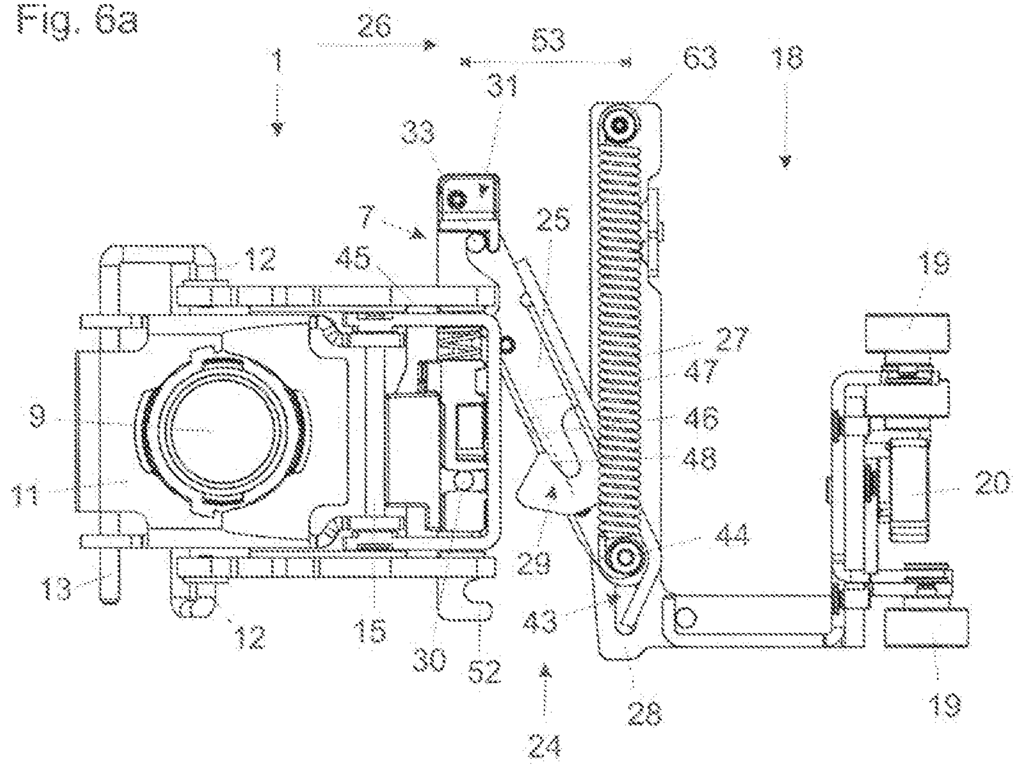
FIGS. 6*a*-6*d* show a sequence of steps during the connection of a connection device and a chassis, in each case in a cross-sectional view from the side.

As emerges in particular from FIG. 6*a*, the locking contour 29 has a sloping surface 48 arranged at an angle 46 of 7°-15°, particularly preferably 11°, relative to a longitudinal extent 47 of the locking element 25. This angle 46 causes a self-locking of the locking pin 30, whereby in the locked position (cf. FIG. 6*d*) the spring force of the spring element 45 is in principle no longer required in order to hold the locking pin 30 securely in the locking contour 29.

A suspension device 31 is furthermore provided via which the connection device 1 can be suspended on the chassis 18. Specifically, as in the case represented, the suspension device 31 can be realized in that the suspension device 31 comprises a suspension contour 32 and a suspension pin 33 which can be suspended in the suspension contour 32. The suspension contour 32 can be arranged on the connection device 1 and the suspension pin 33 can be arranged on the chassis 18, or vice versa.

As emerges in particular from FIGS. 4*a* and 4*b*, the suspension device 31 can have two suspension points 49, as in the embodiment example represented, via which the connection device 1 can be suspended on the chassis 18.

As in the case represented, a joining aid 50 can be provided, through which a suspension at the suspension points 49 can be ensured. The joining aid 50 can for example be made of plastic and/or can be fastened on the connection device 1 by a positive locking 60 and rivets 61 (cf. also FIG. 4*b*).

FIGS. 4*a* and 4*b* show the connection device 1 in detail.

In the embodiment example shown, the connection device 1 is formed as a hinge and comprises two components 6, 7 pivotable relative to each other via an articulated mechanism 5, wherein one of the two components 6, 7 can be connected to the furniture part 2 and the other of the two components 6, 7 can be connected to the furniture carcass 3 or the guide device 4. Specifically, the component 6 has fastening means 55 in the form of holes, in which e.g. screws can be arranged. The component 7 can be connected to the chassis 18 of the guide device 4 via the fastening device 24 already described.

The articulated mechanism 5 has four hinge pins 12, 13, 14, 15, which can be designed e.g. as riveted pivots as in the case represented.

Figure 7A:
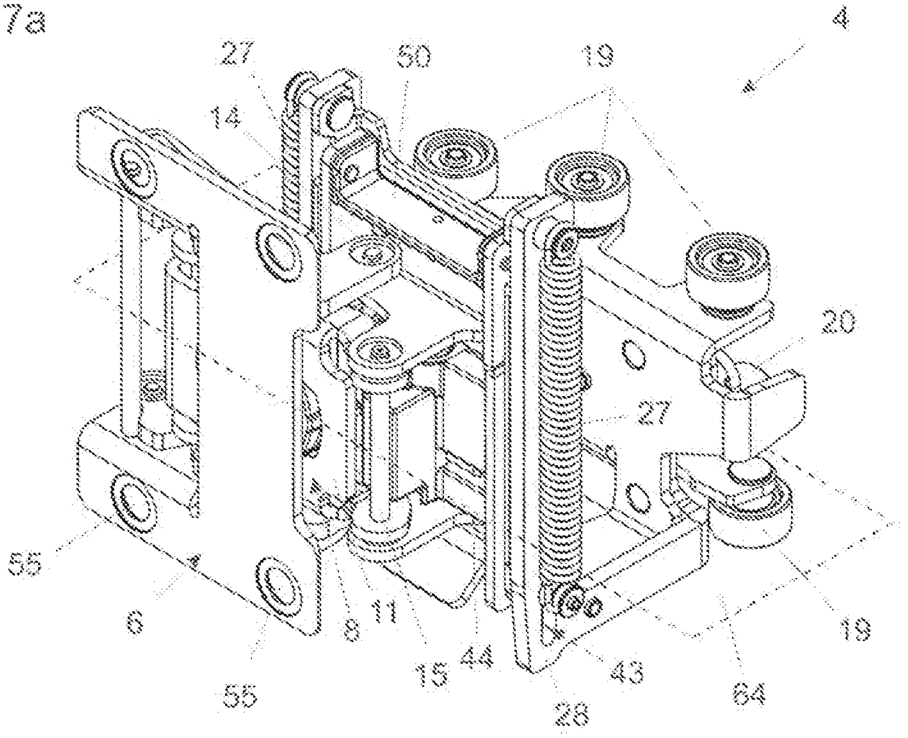
FIGS. 7*a*, 7*b* show a first pivot position of a guide device in a connected state, wherein partial
Figure 7B:
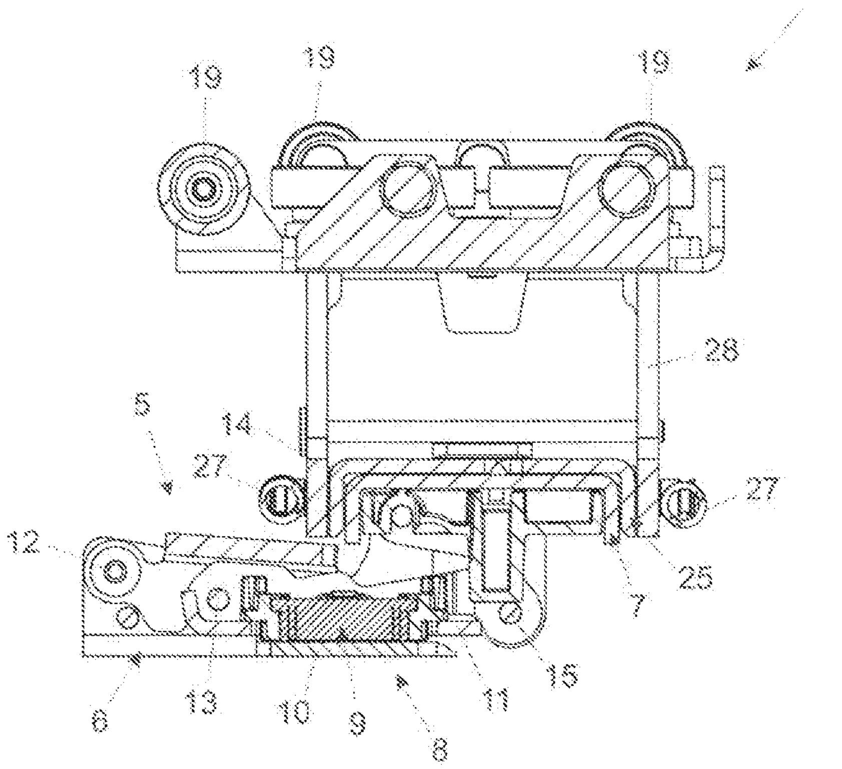

The connection device 1 has a magnetic device 8, with which the two components 6, 7 can be detachably fixed in a pivot position (cf. FIGS. 7*a* and 7*b*). The two components 6, 7 are aligned substantially parallel to each other in the pivot position in which they can be detachably fixed.

The magnetic device 8 has a magnet 9 and a counterpart 10 which can be connected to the magnet 9 and consists of a material that can be attracted by the magnet 9, wherein the magnet 9 can be formed as a permanent magnet as in the case represented and the counterpart 10 can be formed substantially flat.

The magnetic device 8 is partially in the articulated mechanism 5, wherein the articulated mechanism 5 has an intermediate lever 11 and at least one component of the magnetic device 8, specifically the magnet 9, is arranged on the intermediate lever 11. The intermediate lever 11 has a recess 56, into which the magnet 9 is inserted via a holder 57.

The articulated mechanism 5 has a further intermediate lever 59.

At least one further component of the magnetic device 8, specifically the counterpart 10 which can be connected to the magnet 9 and consists of a material that can be attracted by the magnet 9, is arranged on one of the two components 6, 7 pivotable relative to each other, in the case represented on the component 6 that can be connected to the furniture part 2.

The connection device 1 has a slide 58, which can be made of plastic e.g. in regions or completely. The slide 58 has an opening 70 for receiving the spring element 45. The locking pin 30 is furthermore inserted into the slide 58.

The slide 58 is mounted displaceably on the connection device 1 in a displacement direction 68 (cf. FIG. 3*a*).

Figure 5A:
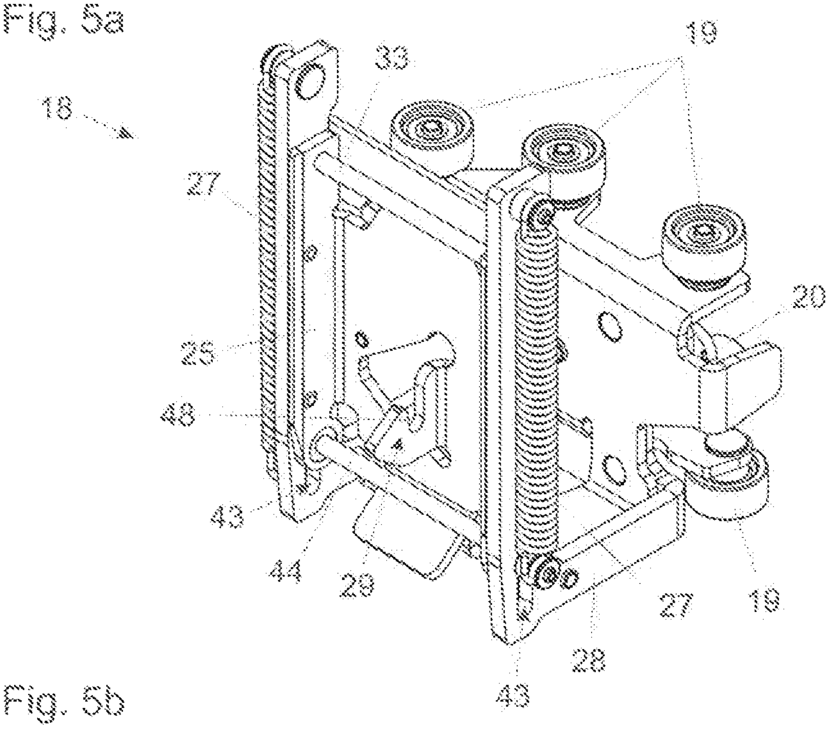
FIGS. 5*a*, 5*b* show an embodiment of a chassis, wherein partial
Figure 5B:
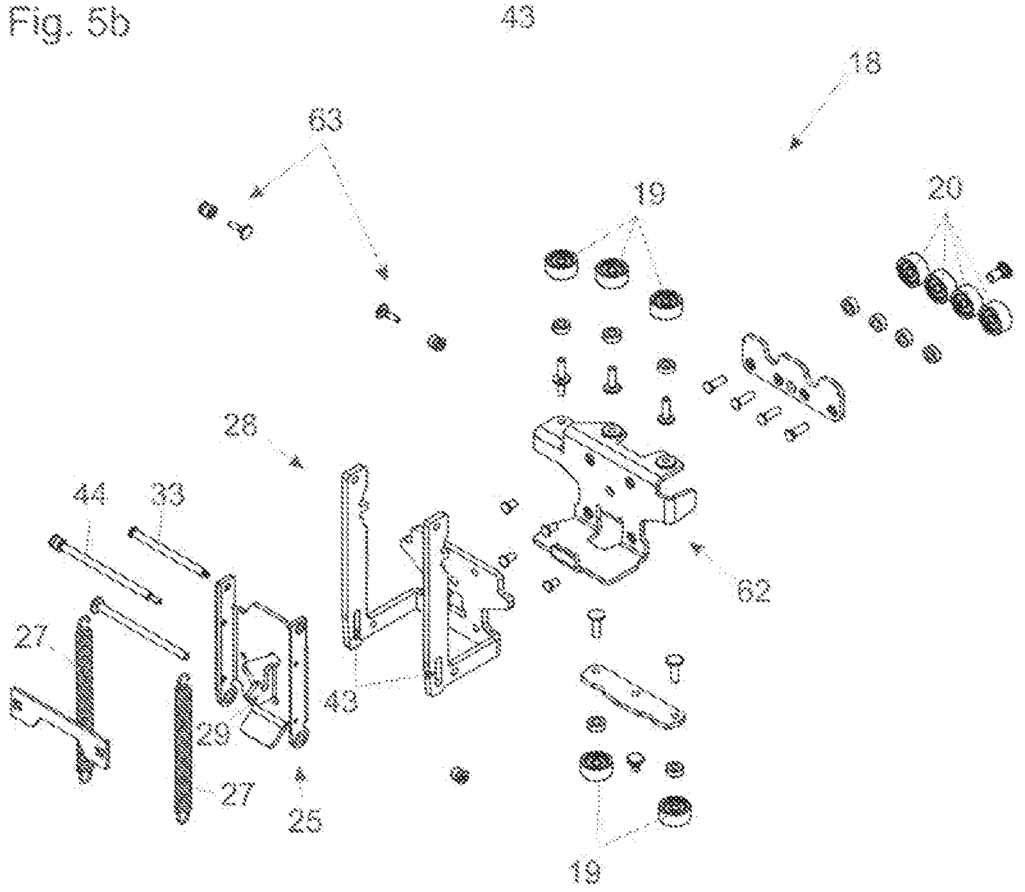

The chassis 18 is represented in detail in FIGS. 5*a* and 5*b*.

In addition to the components already described, the chassis 18 can have a rolling body carrier 62 as in the case represented, on which the rolling bodies 19, 20 are rotatably mounted.

FIGS. 6*a* to 6*d* show a sequence of steps during the connection of a connection device 1 and a chassis 18. The partial figures show different section planes in order to illustrate the relevant components of the guide device 4.

This sequence of steps can be incorporated in a method for installing a furniture part 2 on a guide assembly 34, comprising the following method steps:

- installing the connection device 1 on the furniture part 2, and
- connecting the connection device 1 and the chassis 18 mounted displaceably on the tracks 21, 22, 23 of the guide rail 16 via the fastening device 24, wherein the locking element 25 of the fastening device 24 is rotated and, in the case represented, displaced transverse to a fastening direction 26 of the connection device 1 and the chassis 18.

A suspension device 31 is provided. The connection device 1 is suspended on the chassis 18 via the suspension device 31 before the connection to the chassis 18 (cf. FIG. 6*a*).

The connection device 1, and the furniture part 2 connected thereto, is then moved in the fastening direction 26 towards the chassis 18. In the process a distance 53 from the connection device 1 to the chassis 18 decreases, as emerges in particular from a comparison of FIGS. 6*a* to 6*c*.

Figure 6B:
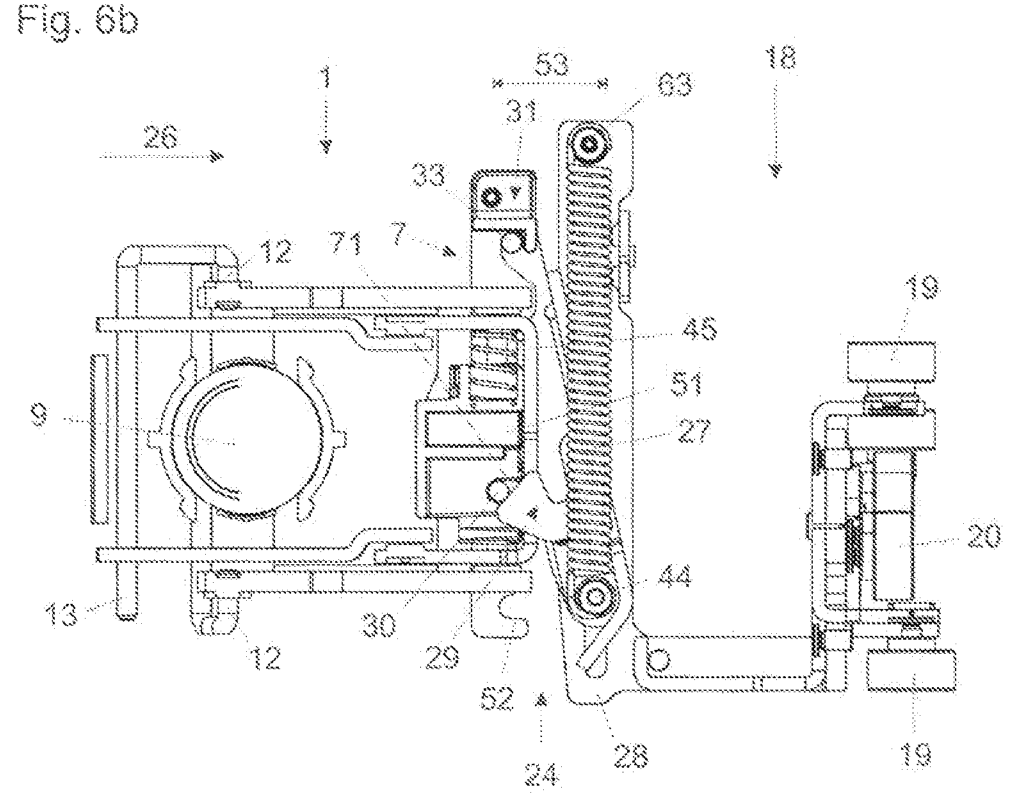
Figure 6C:
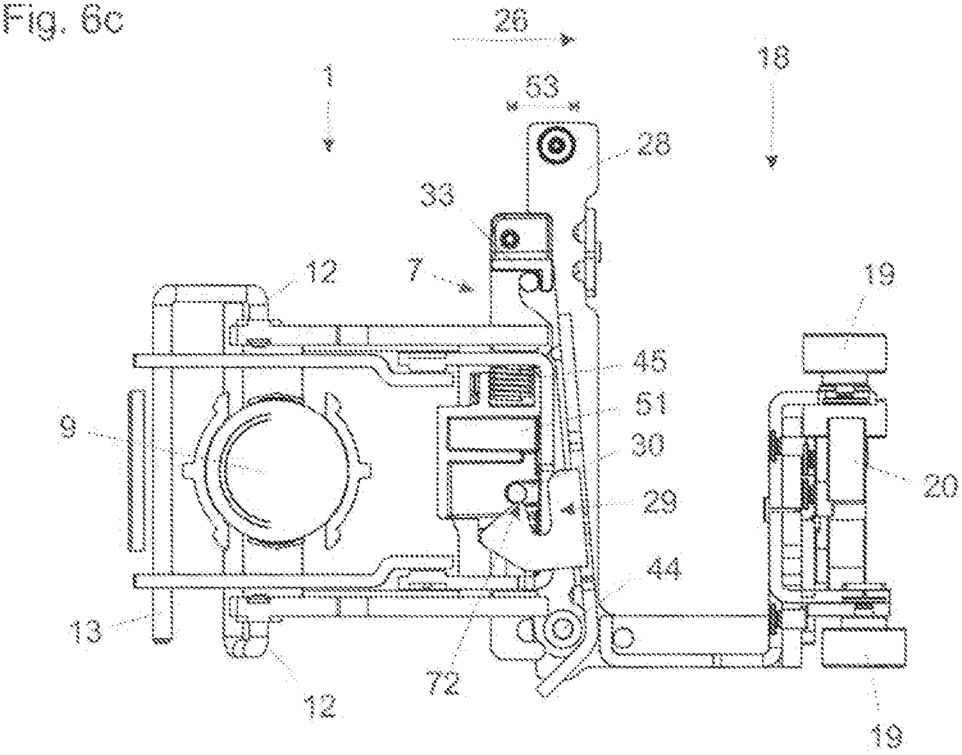

Now the connection device 1 is connected to the chassis 18 via the fastening device 24 (cf. FIGS. 6*b* and 6*c*). The locking pin 30 hits a blocking contour 71. The slide 58 is thereby moved upwards against the spring force of the spring element 45 and in the process compresses the spring element 45. After overcoming a maximum 72 the locking pin 30 slides into the locking contour 29 under the action of the spring element 45.

The locking element 25 is connected to the base 28 of the chassis 18 via springs 27. During the connection of the connection device 1 and the chassis 18, the springs 27 are automatically tensioned.

Figure 6D:
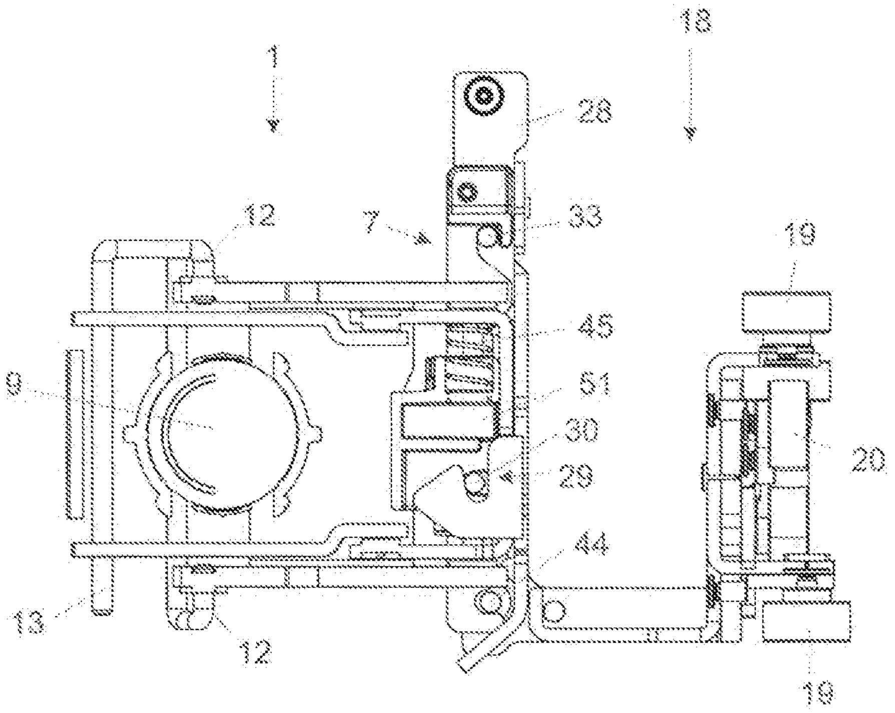

FIG. 6*d* shows the locked position and a state of the guide device 4 in which the connection device 1 is connected to the chassis 18.

Due to the spring force of the spring element 45 the locking pin 30 is present on the locking contour 29 of the locking element 25.

The chassis 18 has two supporting surfaces 52, through which the connection device 1, in addition to the fastening device 24, is secured against a release of the connection between the chassis 18 and the connection device 1, such as the case where an upward travel was to be effected for some reason. In this case, the supporting surfaces 52, against which the pivot pin 44 rests, prevent an unhinging of the connection device 1.

An intentional release of the connection between the chassis 18 and the connection device 1 is nevertheless possible. For this, an unlocking element 51 which can be actuated by a screwdriver and can be moved against the spring force of the spring element 45 is provided. For the unlocking, the unlocking element 51, which can be a pressure piece formed on the slide 58 as in the case represented, is pushed upwards from below using the screwdriver. As a result the locking pin 30 moves out of the locking contour 29. If a light tensile force is exerted on the furniture part 2 at the same time, the connection device 1 lifts off the chassis 18.

The chassis 18 and the connection device 1 are pivotable relative to each other about a pivot pin 44 in the connected state. As a result the furniture part 2 can tilt in the direction of the interior 36, whereby an excessive loading of the rolling bodies 19 can be avoided. As already stated, the connection device 1 comprises a magnetic device 8, with which the two components 6, 7 pivotable relative to each other can be detachably fixed in a pivot position. This is represented in FIGS. 7*a* and 7*b*. The pivot position corresponds to the coplanar relative position of the two panel elements 41, 42 of the furniture part 2. This means that the furniture part 2 can be held in the closed position by the magnetic device 8.

Figure 8A:
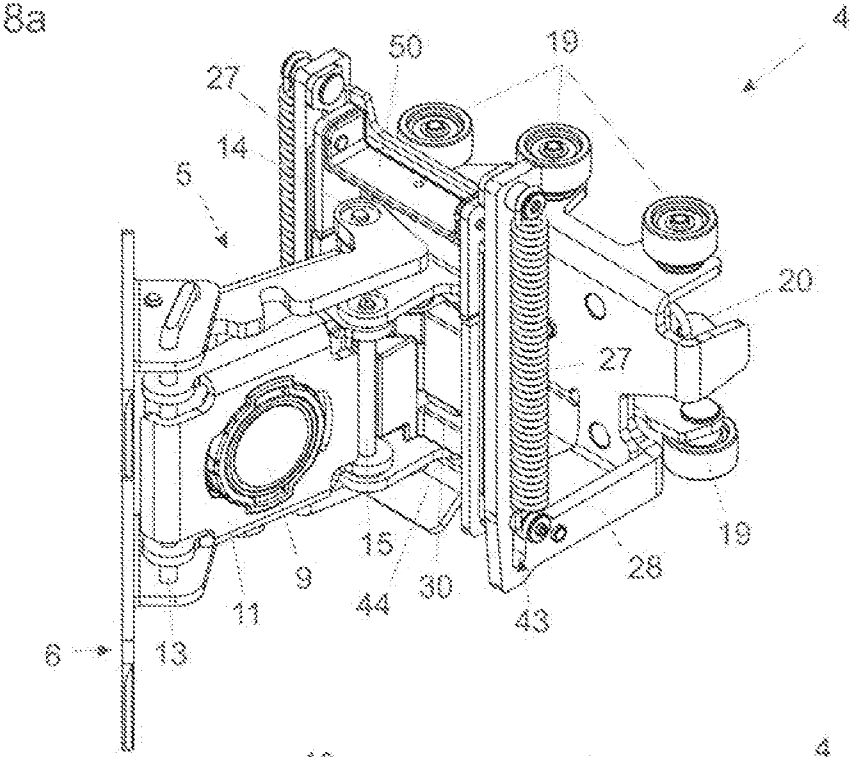
FIGS. 8*a*, 8*b* show a second pivot position of a guide device in a connected state, wherein partial
Figure 8B:
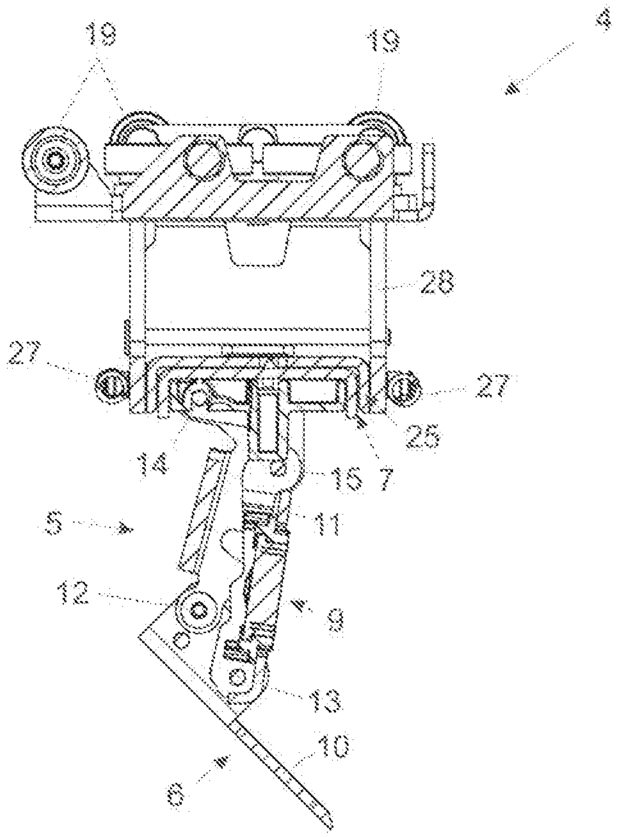

FIGS. 8*a* and 8*b* show a pivot position of the guide device 4 different therefrom, in which the magnetic device 1 is taken out of operation, and in which the two components 6, 7 are freely pivotable relative to each other via the articulated mechanism 5.

The invention claimed is:

1. A guide device for guiding a furniture part on a guide rail, the guide device comprising:

a chassis including a rotatably mounted rolling body configured to allow the chassis to be mounted displaceably on a track of the guide rail, and a connection device formed as a hinge for connecting the guide device to the furniture part, wherein the chassis and the connection device are formed as separate assemblies connectable to each other via a fastening device, wherein the fastening device includes a locking element mounted on the connection device or on the chassis so as to be moveable both rotationally and translationally, wherein the connection device and/or the chassis has a base, the locking element being mounted rotatably and displaceably on the base, and wherein the locking element is connected to the base via a spring arranged on the base and configured to counter a weight of the furniture part and resist translational displacement of the locking element to prevent the furniture part from lowering.

2. The guide device according to claim 1, wherein the chassis and the connection device are pivotable relative to each other about a pivot pin in the connected state.

3. The guide device according to claim 1, wherein the locking element is mounted rotatably and displaceably on the base by a pivot pin mounted displaceably in an elongated hole.

4. The guide device according to claim 1, wherein the spring is connected to the locking element and the base such that the spring is tensioned during a connection of the connection device to the chassis.

5. The guide device according to claim 1, wherein the fastening device comprises a locking contour and a locking pin to be locked in or on the locking contour, wherein the locking contour is arranged on the chassis and the locking pin is arranged on the connection device, or vice versa.

6. The guide device according to claim 1, further comprising a suspension device via which the connection device is suspended on the chassis.

7. The guide device according to claim 6, wherein the suspension device has at least two suspension points via which the connection device is suspended on the chassis.

8. The guide device according to claim 1, wherein the locking element is a pivot plate, and/or includes an unlocking element.

9. The guide device according to claim 1, wherein the at least one chassis has a supporting surface configured to allow the connection device, in addition to the fastening device, to be secured against a release of the connection between the chassis and the connection device.

10. A guide assembly comprising:

a guide rail, and the guide device according to claim 1 for guiding a furniture part on the guide rail.

11. A piece of furniture comprising:

a furniture part, a furniture carcass, and the guide assembly according to claim 10.

12. A method for installing a furniture part on the guide assembly according to claim 10, the method comprising:

installing the connection device on the furniture part, and connecting the connection device and the chassis mounted displaceably on a track of the guide rail via the fastening device, and rotating and displacing the locking element of the fastening device in a direction transverse to a fastening direction of the connection device and the chassis.

13. The method according to claim 12, further comprising decreasing a distance from the connection device to the chassis during the connection of the connection device and the chassis.

14. The method according to claim 12, wherein the locking element is connected to a base via a spring, and the spring is tensioned during the connection of the connection device to the chassis.

15. The method according to claim 12, wherein the guide device further includes a suspension device, and the connection device is suspended on the chassis via the suspension device before the connection to the chassis.

16. The piece of furniture according to claim 11, wherein the piece of furniture has an interior to be at least partially covered by the furniture part and/or has a cavity extending in a depth direction of the piece of furniture for receiving the furniture part.

17. The guide assembly according to claim 10, wherein the guide assembly comprises at least two guide rails arranged substantially transverse to each other.

18. The guide device according to claim 1, wherein the chassis and the connection device are detachably connectable to each other via the fastening device, and the locking element is mounted transverse to a fastening direction of the connection device and the chassis.

19. The guide device according to claim 9, wherein the supporting surface is one of at least two supporting surfaces configured to allow the connection device, in addition to the fastening device, to be secured against a release of the connection between the chassis and the connection device.

20. The guide device according to claim 5, wherein:

the guide device further comprises a spring element configured to apply a spring force to the locking contour and/or the locking pin, and/or the locking contour has a sloping surface arranged at an angle in a range of 7°-15° relative to a longitudinal axis of the locking element.

21. The guide device according to claim 6, wherein the suspension device comprises at least one suspension contour and at least one suspension pin which can be suspended in the at least one suspension contour and the at least one suspension contour is arranged on the at least one connection device and the at least one suspension pin is arranged on the at least one chassis, or vice versa.

22. The guide device according to claim 8, wherein the locking element includes an unlocking element configured to be actuated by a screwdriver and/or to be moved against a spring force of a spring element, and is configured to release the connection between the chassis and the connection device.

23. The guide device according to claim 7, further comprising a joining aid to assist with the suspension of the connection device at the at least two suspension points.

24. A guide device for guiding a furniture part on a guide rail, the guide device comprising:

a chassis including a rotatably mounted rolling body configured to allow the chassis to be mounted displaceably on a track of the guide rail, and a connection device formed as a hinge for connecting the guide device to the furniture part, wherein the chassis and the connection device are formed as separate assemblies connectable to each other via a fastening device, wherein the fastening device includes a locking element mounted rotatably and displaceably on the connection device or on the chassis, and wherein the connection device has at least two components pivotable relative to each other via an articulated mechanism, and the guide device further comprises a magnetic device configured to detachably fix the at least two components in at least one pivot position.

25. The guide device according to claim 24, wherein:

the at least two components are aligned substantially parallel to each other in the at least one pivot position, and/or the magnetic device includes a magnet and a counterpart to be connected to the magnet, and is at least partially formed of a material to be attracted by the magnet, wherein the magnet is a permanent magnet and/or the counterpart is substantially flat.

* * * * *